United States Patent
Zhou et al.

(10) Patent No.: US 11,681,122 B1
(45) Date of Patent: Jun. 20, 2023

(54) BINOCULAR CALIBRATION TARGET

(71) Applicant: MLOptic Corp, Redmond, WA (US)

(72) Inventors: Wei Zhou, Sammamish, WA (US); Pengfei Wu, Nanjing (CN); Wei Wang, Nanjing (CN)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 17/870,891

(22) Filed: Jul. 22, 2022

Related U.S. Application Data

(62) Division of application No. 17/683,295, filed on Feb. 28, 2022, now Pat. No. 11,474,324.

(51) Int. Cl.
  *G02B 7/182* (2021.01)
  *G02B 27/30* (2006.01)
  *G02B 27/14* (2006.01)

(52) U.S. Cl.
  CPC .......... *G02B 7/1822* (2013.01); *G02B 27/14* (2013.01); *G02B 27/30* (2013.01)

(58) Field of Classification Search
  CPC ........ G02B 27/14; G02B 27/30; G02B 7/629; G02B 7/1822

USPC .......................................................... 359/629
See application file for complete search history.

(56) References Cited

U.S. PATENT DOCUMENTS

2003/0058516 A1* 3/2003 Scott .................. H04B 10/1149
                                                        359/246

\* cited by examiner

*Primary Examiner* — Joseph P Martinez
*Assistant Examiner* — Mitchell T Oestreich
(74) *Attorney, Agent, or Firm* — Tracy Jong Law Firm; Tracy P. Jong; Cheng Ning Jong

(57) ABSTRACT

A system for providing two parallel light beams spaced-apart a selectable distance, the system including: a first beam splitter configured for reflecting a light beam from a light source to create a first datum light beam, the first beam splitter is fixedly attached to a base; a second beam splitter configured for reflecting a transmitted light beam from the light beam from the light source to create a second datum light beam, a third beam splitter configured for reflecting a transmitted light beam from the light beam from the light source to create a third datum light beam, a fourth beam reflecting device configured for reflecting a transmitted light beam from the light beam from the light source to create a fourth light beam. Each of the second, third beam splitters and fourth beam reflecting device is configured to be slidingly attached to the base.

3 Claims, 4 Drawing Sheets

BINOCULAR CALIBRATION TARGET

PRIORITY CLAIM AND RELATED APPLICATIONS

This divisional application claims the benefit of priority from non-provisional application U.S. Ser. No. 17/683,295 filed Feb. 28, 2022. Said application is incorporated by reference in its entirety.

BACKGROUND OF THE INVENTION

1. The Field of the Invention

The present invention relates to a calibration system for a pair of binoculars. More specifically, the present invention is directed to a datum-based expandable calibration system for a pair of binoculars.

2. Background Art

Product performance testing of a pair of binoculars, e.g., Augmented Reality/Virtual Reality (AR/VR) glasses requires the use of perfectly parallelly-disposed light beams received at the entrance pupils of the glasses to simulate a pair of human eyes. A deviation or defect of any one of the light paths through the entrance pupils of the glasses is sufficient to cause severe discomfort to a user of the glasses. The genesis of a deviation of a light path through an entrance pupils of AR/VR glasses can be imperfections introduced during fabrication, shipping and/or use of the AR/VR glasses. During a quality control process, a calibration system may be used in conjunction with the glasses to calibrate the glasses by indicating a deviation and adjusting one or more light paths of the glasses to eliminate the deviation. However, for the calibration system to be effective, the calibration system itself is required to be precise and free from any defects even when the interpupillary distance (IPD) of the calibration system is adjustable in the range of about 60 mm-220 mm. One such requirement is for the light beams useful for indicating whether the light paths through the entrance pupils of the glasses are disposed in parallel. Like the glasses themselves, the calibration system useful for the calibrating the glasses is equally likely to be subject to imperfections introduced during fabrication, shipping and/or use of the calibration system. The interpupillary distance (IPD) of a general adult is between about 60 mm and 75 mm and the image projection module of the glasses is arranged at the outer end close to the human ear and the distance between exit pupils is between about 110-135 mm. In some instances, the IPD of the calibration system needs to cover a width of about 60 mm-135 mm. In the AR/VR virtual reality display equipment performance detection process, a target source or calibration system with a large IPD and a wide object distance range is required. A collimator suitable for providing large-aperture beams and wide object distances is large and costly and requires a large space to accommodate it, i.e., a space unavailable in a compact calibration system. The distance between the exit pupils of a suitable calibration system needs to be about 60 mm-200 mm.

There exists a need for a system for providing a calibration system having two light beams and the IPD of the two light beams must be capable of adjustment such that the distance between the two light beams is adjustable to coincide with the IPD of the glasses at exit pupils. Further, at least one of the light beams must be capable of adjustment such that the two light beams can be disposed in a perfectly parallel configuration.

SUMMARY OF THE INVENTION

In accordance with the present invention, there is provided a system for providing two parallel light beams spaced-apart a selectable distance, the system including:
(a) a first beam splitter configured for reflecting a light beam from a light source to create a first datum light beam and the first datum beam splitter is configured to be fixedly attached to a base;
(b) a second beam splitter configured for reflecting a transmitted light beam from the light beam from the light source to create a second light beam and the second beam splitter is configured to be slidingly attached to the base; and
(c) a collimator configured for directing the first datum light beam and the second light beam onto an image plane, wherein if a cast image of the first datum light beam is not coincidental with respect to the second light beam, the second light beam is adjusted by at least one of a rotation of the second beam splitter and a translation of the second beam splitter along the base such that a cast image of the second light beam coincides with the first datum light beam, the second light beam is said to have become a second datum light beam and the first datum light beam is said to be parallelly disposed with respect to the second light beam.

In one embodiment, the system further includes a third beam splitter configured for reflecting a transmitted light beam from the light beam from the light source to create a third light beam and the third beam splitter is configured to be slidingly attached to the base, wherein the collimator is further configured for directing the second datum light beam and the third light beam onto the image plane, wherein if a cast image of the second datum light beam is not coincidental with respect to the third light beam, the third light beam is adjusted by at least one of a rotation of the third beam splitter and a translation of the third beam splitter along the base such that a cast image of the third light beam coincides with the second datum light beam, the third light beam is said to have become a third datum light beam and the second datum light beam is said to be parallelly disposed with respect to the third light beam. In one embodiment, the system further includes a fourth beam splitter configured for reflecting a transmitted light beam from the light beam from the light source to create a fourth light beam and the fourth beam splitter is configured to be slidingly attached to the base, wherein the collimator is further configured for directing the third datum light beam and the fourth light beam onto the image plane, wherein if a cast image of the third datum light beam is not coincidental with respect to the fourth light beam, the fourth light beam is adjusted by at least one of a rotation of the fourth beam splitter and a translation of the fourth beam splitter along the base such that a cast image of the fourth light beam coincides with the third datum light beam, the fourth light beam is said to have become a fourth datum light beam and the third datum light beam is said to be parallelly disposed with respect to the fourth light beam. In one embodiment, the second light beam is disposed at a perpendicular distance of about 90 mm from the first light beam. In one embodiment, the third light beam is disposed at a perpendicular distance of about 90 mm from the second light beam. In one embodiment, the fourth light beam is disposed at a perpendicular distance of about 90 mm from the third light beam. In one embodiment, the system further includes at least one shutter to block one of the second datum light beam, the third datum light beam and the fourth light beam when one of the second datum light beam, the third datum light beam and the fourth light beam is not in use. In one embodiment, the system further includes an image plane configured for receiving an image resulting from directing the first datum light beam and one of the second datum light beam, the third datum light beam and the fourth light beam through exit pupils of a pair of binoculars to an entrance pupil of the pair of binoculars and if the image is determined to be of non-coincidental cast images through the exit pupils of the pair of binoculars by the first datum light beam and one of the second datum light beam, the third datum light beam and the fourth light beam, a light path through a first of the exit pupils of the pair of binoculars is determined to be not parallel to a light path through a second of the exit pupils of the pair of binoculars.

In accordance with the present invention, there is further provided a method for providing two spaced-apart parallel light beams at a selectable distance, one of the two spaced-apart parallel light beams is a first datum light beam, the method including establishing a second light beam parallel to the first datum light beam based on the first datum light beam to create a second datum light beam, wherein the step for establishing a second light beam includes receiving an image resulting from directing the first datum light beam and the second light beam through a collimator, if the image is determined to be of non-coincidental cast images by the first datum light beam and the second light beam, the second light beam is adjusted such that the image becomes coincidental with the first datum light beam.

In one embodiment, the method further includes establishing a third light beam parallel to the second datum light beam based on the second datum light beam to create a third datum light beam, wherein the step for establishing a third light beam includes receiving an image resulting from directing the second datum light beam and the third light beam through a collimator, if the image is determined to be of non-coincidental cast images by the second datum light beam and the third light beam, the third light beam is adjusted such that the image becomes coincidental with the second datum light beam. In one embodiment, the method further includes establishing a fourth light beam parallel to the third datum light beam based on the third datum light beam, wherein the parallelity of the fourth light beam is indirectly established with respect to the first datum light beam, wherein the step for establishing a fourth light beam includes receiving an image resulting from directing the third datum light beam and the fourth light beam through a collimator, if the image is determined to be of non-coincidental cast images by the third datum light beam and the fourth light beam, the fourth light beam is adjusted such that the image becomes coincidental with the third datum light beam.

An object of the present invention is to provide a calibration target for exit pupils disposed at a large interpupillary distance (IPD).

Another object of the present invention is to provide a passive calibration target for exit pupils disposed at a large IPD.

Another object of the present invention is to provide an adjustable calibration target for exit pupils of glasses or binoculars disposed at various large IPDs.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—binocular calibration system
4—light source
6—beam splitter
8—light beam
10—base
12—camera
14—movement
16—translation mechanism
18—shutter
20—image plane
22—entrance pupil of binoculars
24—perpendicular distance between two consecutive light beams
26—cast image
28—exit pupil
30—binoculars or binocular telescope
32—cast image
34—collimator
36—reticle
38—first central axis
40—second central axis
42—third central axis
44—fourth central axis
46—rotation mechanism
48—drive gear
50—driven gear
52—beam splitter orientation prior to correction
54—beam splitter orientation after correction
56—image plane

PARTICULAR ADVANTAGES OF THE INVENTION

The present system is a passive system and does not require self-monitoring of the parallelity of the two consecutive light beams. As such, the system requires no rotation and/or translation mechanisms that automatically adjust the orientation and/or position of optical devices, e.g., beam splitters. The present system does not require a dedicated optical feedback device to ensure that two consecutive light beams are parallel. Rather, a calibrated pair of binoculars can be used to ensure that two consecutive light beams are parallel. As such, the system is simpler in its construction and design and requires no controllers to detect the lack of parallelity between two light beams.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
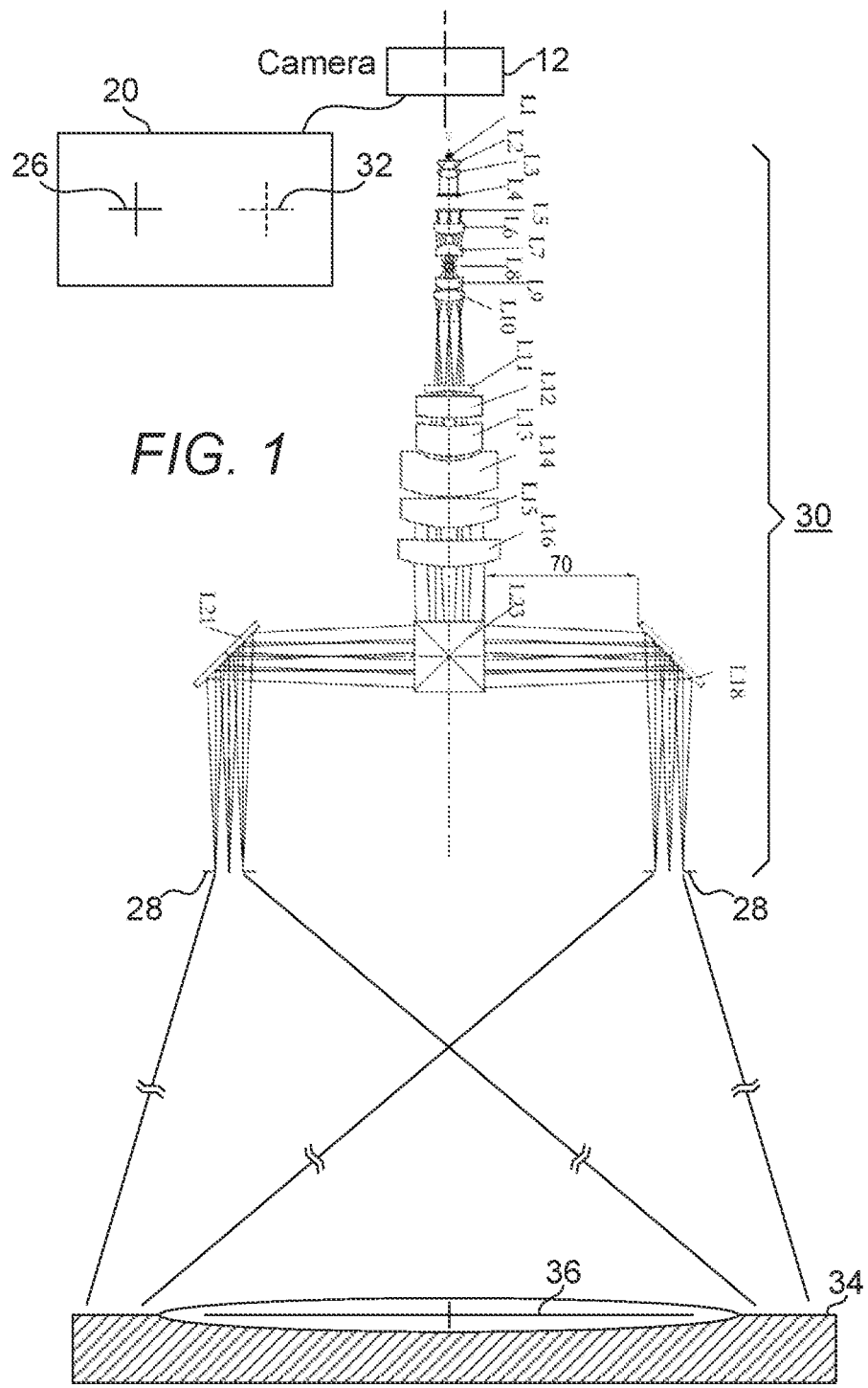
FIG. 1 is a diagram depicting one embodiment of a system for providing collimated light beams to be supplied to two space-apart exit pupils of a pair of binoculars for calibration.
Figure 2:
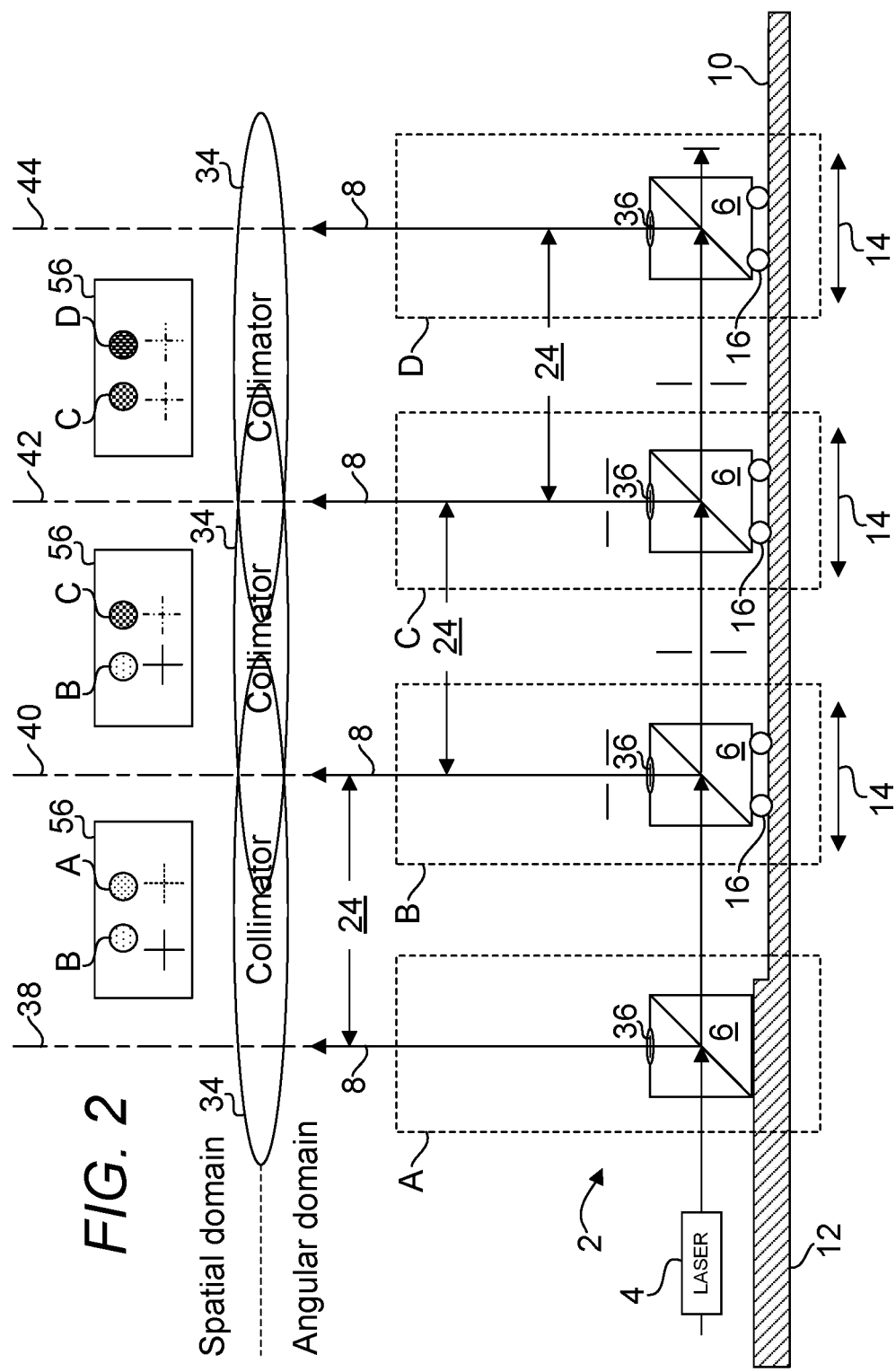
FIG. 2 is a diagram depicting one embodiment of a present system for providing highly-precise two spaced-apart parallel light beams, wherein the space between the two spaced-apart parallel light beams is configured to be adjustable.
Figure 3:
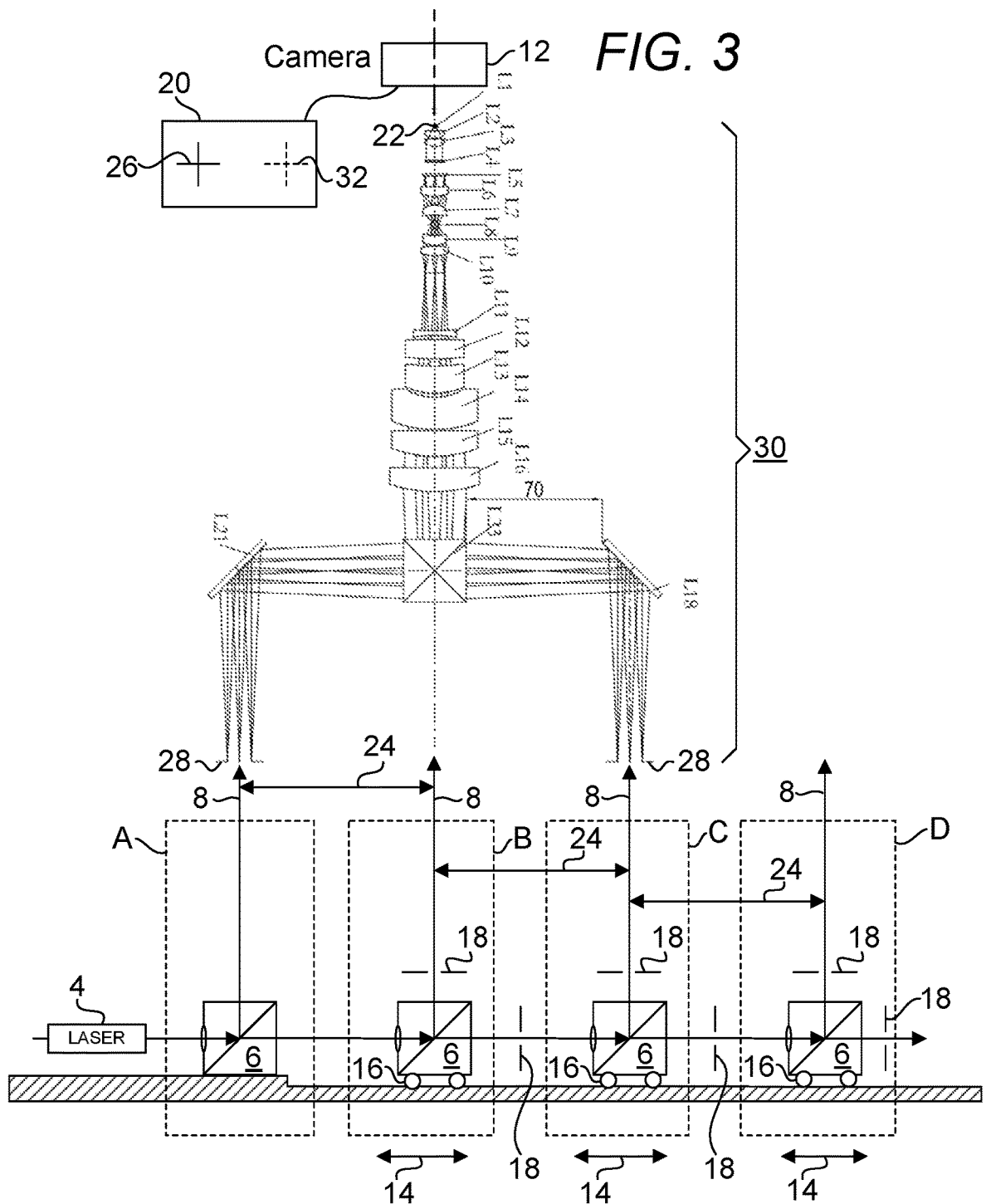
FIG. 3 is a diagram depicting one embodiment of a present system for providing highly-precise two spaced-apart parallel light beams used in calibrating the light paths of a pair of binoculars.

FIG. 1 is a diagram depicting one embodiment of a system for providing collimated light beams to be supplied to two space-apart exit pupils 28 of a pair of binoculars 30, e.g., a pair of augmented reality/virtual reality (AR/VR) binoculars or a binocular telescope, for calibration. In calibrating the pair of binoculars 30, a large collimator 34 may be used to dispose the light beams entering the pair of binoculars through the exit pupils 28 in parallel configuration with the light paths of the binoculars 30. In this system, in order for the exit pupils 28 to allow images to traverse the light paths of the binoculars 30 and be cast at a camera 12 disposed at the entrance pupil 22 end of the binoculars 30, the reticle 36 must be visible by the camera 12. A large interpupillary distance (IPD) necessarily requires the collimator 34 and the reticle 36 to be disposed at a large distance from the exit pupils 28 of the binoculars 30, making the entire setup of the collimator 34 large, costly and impractical due to weight and space limitations of the setup. In addition, if there are binoculars 30 having significantly different IPDs to be calibrated, multiple sets of collimators 34 and reticles 36 may be required, further adding to the costs and setup time. An image plane 20 or display of camera 12 shows images 26, 32 cast on and received by the camera 12. As shown, in order to calibrate the light paths of the binoculars 30, adjustments to the light paths must be made until the two cast images 26, 32 of the reticle 36 overlap one another. It is imperative that a calibration setup that is less costly, having more compact form factor and higher calibration throughputs be made available to enhance the optical calibration process of a pair of binoculars. FIGS. 2-3 depict various aspects of a present calibration system for a pair of binoculars capable for use in calibrating binoculars having a large range of IPDs without requiring changeouts of any calibration setups.

FIG. 2 is a diagram depicting one embodiment of a present system for providing highly-precise two spaced-apart parallel light beams 8, wherein the space between the two spaced-apart parallel light beams 8 is configured to be adjustable and the system 2 is configured to be useful for calibrating binoculars having vastly different interpupillary distances (IPDs) or a large range of IPDs. Without a self-monitoring mechanism to ensure that two light beams to be used for calibrating a pair of binoculars 30 or to ensure that two light beams have remained parallel upon adjustment of the perpendicular distance between them to match exit pupils of the pair of binoculars, adjustments that span such a distance must be kept to a minimum, e.g., no more than 90 mm to reduce the risk of causing degradation in parallelity in the two light beams. When the parallelity of two light beams is to be ascertained, the two light beams must themselves be calibrated, e.g., with a collimator as disclosed elsewhere herein. Shown in FIG. 2 is essentially one embodiment of a system 2 useful for providing two parallel light beams spaced-apart a selectable distance. The system 2 includes, from left to right, a first beam splitter 6, a second beam splitter 6, a third beam splitter 6 and a fourth beam splitter 6. Combinations of these beam splitters increase the chance that a necessary perpendicular distance between two parallel light beams (to match the IPD of a pair of binoculars) can be obtained using a pair of beam splitters to reflect light from the light source 4. The first beam splitter 6 is configured for reflecting a light beam from a light source 4 to create a first datum light beam 8, wherein the first datum light beam 6 is configured to be disposed along a first central axis 38 and the first beam splitter 6 is configured to be fixedly attached to a base 10. The second beam splitter 6 is configured for reflecting a transmitted light beam from the light beam from the light source 4 to create a second light beam 8, wherein the second light beam is configured to be disposed along a second central axis 40 and the second beam splitter 6 is configured to be slidingly attached to the base 10. The third beam splitter 6 is configured for reflecting a transmitted light beam from the light beam from the light source 4 to create a third light beam 8, wherein the third light beam is configured to be disposed along a third central axis 42 and the third beam splitter 6 is configured to be slidingly attached to the base 10. The fourth beam splitter is configured for reflecting a transmitted light beam from the light beam from the light source 4 to create a fourth light beam 8, wherein the fourth light beam 8 is configured to be disposed along a fourth central axis 44 and the fourth beam splitter 6 is configured to be slidingly attached to the base 10. The system 2 includes a plurality of light reflecting and transmitting devices disposed at advantageous distances from one another. Although only a pair of light beams are used at any one IPD calibration activity, more than two light beam reflecting and transmitting devices are provided to supply two parallel light beams at more than one IPD without requiring a single beam splitter to be adjusted over large distances. Here, there is provided a total of four beam splitters 6 although the rightmost beam splitter 6 could be substituted with a mirror instead, as no transmittance by this beam splitter is expected. A full range of IPDs can be cooperatively met by the three sets of light beams. For simplicity and clarity in referencing the sets, each light beam has been assigned a letter "A," "B," "C," or "D" with the leftmost light beam labelled "A" and the rightmost light beam labelled "D." As used herein, depending on the context, each letter can refer to the light beam, beam splitter, mobility mechanism and/or another optical device and/or another component responsible for generating the light beam associated with this letter. Once the parallelity of each light beam with respect to another has been ensured, the AB, AC and AD pairs can be used to calibrate the parallelity of light paths of a pair of binoculars. In FIG. 2, a device useful for ensuring the pairs of light beams are parallel, is represented as a collimator 46. As disclosed in FIG. 1 elsewhere herein, a single collimator large enough for use to ensure the AD pair of light beams are parallel or even the AC (with a smaller perpendicular distance between the light beams than AD), would be impractical and costly. In FIG. 2, only one collimator 46 is used to ensure parallelity of AB, BC and CD sequentially although the collimator 46 is shown in three positions. In ensuring the parallelity of a pair of light beams, e.g., AB, images are cast on an image plane, e.g., an image plane 56, e.g., of a camera through a collimator 34. Parallelity of AB has been achieved if its light beam B have been adjusted to produce an overlapped image of cast images 26, 32 due to AB. Once the parallelity of AB has been ensured, B becomes a datum as well with which the parallelity of a subsequent light beam is based. The process of ensuring that C is parallel with respect to B can be carried out according to the process in which the parallelity of B was ascertained with respect to A. Again, once the parallelity of BC has been ensured, C becomes a datum as well with which the parallelity of a subsequent light beam is based. The process of ensuring that D is parallel with respect to C can be carried out according to the process in which the parallelity of C was ascertained with respect to B. Once the parallelity of all light beams has been ensured, any pair of light beams 8 can be used for calibrating a pair of binoculars as shown in FIG. 3. The system further includes shutters 18 advantageously placed in the plurality of light paths of the system to block or allow the respective light beams they control. For instance, if only AD are necessary, B and C should be blocked with their respective shutters of the second datum light beam, the third datum light beam and the fourth light beam when the one of the second datum light beam, the third datum light beam and the fourth light beam is not in use. It can therefore be summarized that a method for providing two spaced-apart parallel light beams at a selectable distance, one of the two spaced-apart parallel light beams is a first datum light beam, the method including establishing a second light beam parallel to the first datum light beam based on the first datum light beam to create a second datum light beam. The step for establishing a second light beam includes receiving an image resulting from directing the first datum light beam and the second light beam through a collimator, if the image is determined to be of non-coincidental cast images by the first datum light beam and the second light beam, the second light beam is adjusted such that the image becomes coincidental with the first datum light beam. In one embodiment, the method further includes establishing a third light beam parallel to the second datum light beam based on the second datum light beam to create a third datum light beam. The step for establishing a third light beam includes receiving an image resulting from directing the second datum light beam and the third light beam through a collimator, if the image is determined to be of non-coincidental cast images by the second datum light beam and the third light beam, the third light beam is adjusted such that the image becomes coincidental with the second datum light beam. In one embodiment, the method further includes establishing a fourth light beam parallel to the third datum light beam based on the third datum light beam, wherein the parallelity of the fourth light beam is indirectly established with respect to the first datum light beam, wherein the step for establishing a fourth light beam includes receiving an image resulting from directing the third datum light beam and the fourth light beam through a collimator, if the image is determined to be of non-coincidental cast images by the third datum light beam and the fourth light beam, the fourth light beam is adjusted such that the image becomes coincidental with the third datum light beam.

FIG. 3 is a diagram depicting one embodiment of a present system for providing highly-precise two spaced-apart parallel light beams 8 used in calibrating the light paths of a pair of binoculars. Upon ensuring that the system can produce two parallel light beams 8 space-apart a suitable perpendicular distance, the light paths of the binoculars 30 can then be calibrated. In use, a pair of binoculars allows light to enter at the entrance pupil end before splitting the image received at the entrance pupil end into two light paths exiting the exit pupils. By the same token, in calibrating the light paths of the pair of binoculars, the two parallelly-disposed light beams supplied at the exit pupils shall result in a unified image that is an aggregate of the two parallelly-disposed light beams. Therefore, in calibrating the binoculars, the light paths of the binoculars are adjusted such that a resulting image at the entrance pupil 22 end is a unified image of the two parallelly-disposed light beams. In one embodiment, the present system includes a camera 12 configured for receiving an image resulting from directing a light beam 8 and another light beam 8 through exit pupils 28 of a pair of binoculars 30 to an entrance pupil 22 of the pair of binoculars 30 and a control device to which the camera 12 is functionally connected and if the image is determined to be of non-coincidental cast images 26, 32 through the exit pupils 28 of the pair of binoculars 30 by the light beam 8 and the other light beam 8, a light path through a first of the exit pupils 28 of the pair of binoculars 30 is determined to be not parallel to a light path through a second of the exit pupils 28 of the pair of binoculars 30. Here, the IPD of the pair of binoculars 30 calls for the use of AC instead of other combinations, e.g., AB and AD as the adjustments required to bring the perpendicular distance 24 between A and C to match the IPD of the exit pupils 28 is minimal, significantly reducing the risk that the parallelity of AC is compromised when the adjustments were made. Translation adjustments along the width of the base 10 can be made with a translation mechanism 16 that is configured to make a beam splitter 6 slidingly adjustable along a widthwise direction of the base 10 with a movement 14 shown in FIG. 2 or FIG. 3. If rotation correction to a beam splitter 6 is required, it can be made by way of a rotation mechanism, an example of which is shown elsewhere herein.

Figure 4:
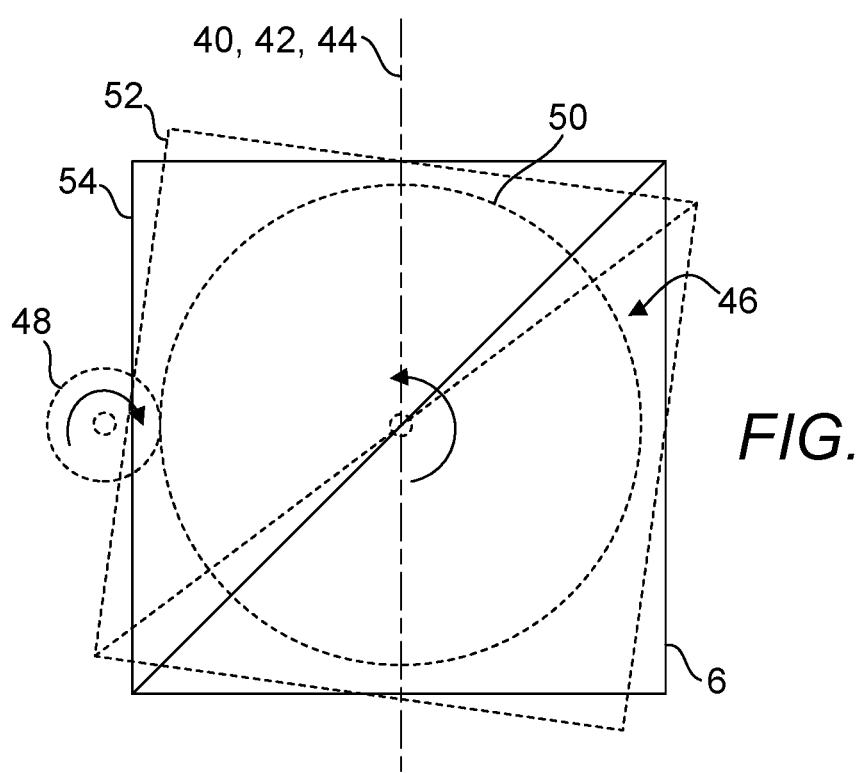
FIG. 4 is a diagram depicting a manner in which the orientation of a beam splitter is corrected.

FIG. 4 is a diagram depicting a manner in which the orientation of a beam splitter is corrected. Although a rotation mechanism 50 using a plurality of gears 48, 50 is shown, other types of positional or orientational/rotational correction mechanisms may be used. Shown herein is a beam splitter 6 disposed in an orientation 52 prior to its orientation correction due to a deviation in the orientation of the beam splitter 6. Upon correction, the beam splitter is shown disposed in orientation 54. Here, a drive gear 52 is used to correct the orientation of the beam splitter by driving the driven gear 54 attached to the beam splitter 6 such that a rotation of the drive gear 52 results in a rotation of the beam splitter 6 and the driven gear 54 in unison. In one embodiment, the cast images, e.g., B, A are cast images of light spots and/or reticles 36 to ensure that completion of a correction process for bringing a light beam into parallelity with a datum light beam can be easily discerned. Referring back to FIG. 2, non-parallelity of two light beams causes the two light beams to appear as light spots A, B, C, D or reticles if reticles are used. For example, the paralellity of light beam B that is translated and/or rotated or otherwise corrected with respect to datum light beam A can be said to have achieved parallelity with datum light beam A when the cast images B, A overlap one another. Referring back to FIG. 3, calibration of the light paths of the binoculars may be accomplished manually. In a manual process, the light paths of the binoculars are adjusted manually until the cast images 26, 32 are observed to overlap one another. A requirement for calibration of the light paths of the binoculars originates from the determination that the cast images 26, 32 do not overlap. The light paths of the binoculars are adjusted and another determination of whether the cast images 26, 32 approach one another is made. If they do, continue the adjustments until the cast images 26, 32 overlap. If they depart from one another, reverse the adjustments until the cast images 26, 32 overlap.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for providing two spaced-apart parallel light beams at a selectable distance, one of the two spaced-apart parallel light beams is a first datum light beam, said method comprising establishing a second light beam parallel to the first datum light beam based on said first datum light beam to create a second datum light beam, wherein said step for establishing a second light beam parallel to the first datum light beam comprises receiving an image resulting from said first datum light beam and said second light beam directed through a collimator and a pair of binoculars, if said image is determined to be of non-coincidental cast images by said first datum light beam and said second light beam, said second light beam is adjusted such that said cast image of said second light beam becomes coincidental with said cast image of said first datum light beam.

2. The method of claim 1, further comprising establishing a third light beam parallel to said second datum light beam based on said second datum light beam to create a third datum light beam, wherein said step for establishing a third light beam parallel to said second datum light beam comprises receiving an image resulting from said second datum light beam and said third light beam directed through the collimator and the pair of binoculars, if said image is determined to be of non-coincidental cast images by said second datum light beam and said third light beam, said third light beam is adjusted such that said cast image of said third light beam becomes coincidental with said cast image of said second datum light beam.

3. The method of claim 2, further comprising establishing a fourth light beam parallel to said third datum light beam based on said third datum light beam to create a fourth datum light beam, wherein said step for establishing a fourth light beam parallel to said third datum light beam comprises receiving an image resulting from said third datum light beam and said fourth light beam directed through the collimator and the pair of binoculars, if said image is determined to be of non-coincidental cast images by said third datum light beam and said fourth light beam, said fourth light beam is adjusted such that said cast image of said fourth light beam becomes coincidental with said cast image of said third datum light beam.

\* \* \* \* \*